United States Patent
Bagagli et al.

(10) Patent No.: US 10,830,231 B2
(45) Date of Patent: Nov. 10, 2020

(54) POSITIVE DRIVE ACTUATED VALVE FOR RECIPROCATING COMPRESSOR AND METHOD

(71) Applicant: Nuovo Pignone SRL, Florence (IT)

(72) Inventors: Riccardo Bagagli, Florence (IT); Leonardo Tognarelli, Florence (IT)

(73) Assignee: Nuovo Pignone SrL, Florence (IT)

( * ) Notice: Subject to any disclaimer, the term of this patent is extended or adjusted under 35 U.S.C. 154(b) by 652 days.

(21) Appl. No.: 14/397,959

(22) PCT Filed: May 1, 2013

(86) PCT No.: PCT/EP2013/059059
§ 371 (c)(1),
(2) Date: Oct. 30, 2014

(87) PCT Pub. No.: WO2013/164369
PCT Pub. Date: Nov. 7, 2013

(65) Prior Publication Data
US 2015/0118083 A1    Apr. 30, 2015

(30) Foreign Application Priority Data

May 2, 2012   (IT) .............................. CO2012A0021

(51) Int. Cl.
*F04B 49/22*    (2006.01)
*F16K 31/524*    (2006.01)
(Continued)

(52) U.S. Cl.
CPC .......... *F04B 49/225* (2013.01); *F04B 7/0057* (2013.01); *F04B 39/10* (2013.01);
(Continued)

(58) Field of Classification Search
CPC .......... F04B 39/10; F04B 49/225; F04B 7/00; F04B 7/0053; F04B 7/0057; F04B 7/0061;
(Continued)

(56) References Cited

U.S. PATENT DOCUMENTS 4,044,996 A    8/1977 Kodaira
4,089,505 A    5/1978 Anderle et al.
(Continued)

FOREIGN PATENT DOCUMENTS

| CN | 1622433 A | 6/2005 |
|---|---|---|
| CN | 101725505 A | 6/2010 |

(Continued)

OTHER PUBLICATIONS

Unofficial English Translation of Japanese Search Report issued in connection with Corresponding JP Application No. 2015509426 dated Feb. 3, 2017.
(Continued)

*Primary Examiner* — Philip E Stimpert
(74) *Attorney, Agent, or Firm* — Baker Hughes Patent Org.

(57) ABSTRACT

Positive drive valve actuating mechanisms useable to operate a valve of a reciprocating compressor for oil and gas industry and related methods are provided. The valve actuating mechanism includes a driver configured to perform a rotating motion and a follower connected to a mobile part of the valve and to the driver. The follower is configured to transform the rotating motion of the driver into a reciprocating motion to open the valve and to close the valve, respectively.

4 Claims, 8 Drawing Sheets

(51) Int. Cl.
*F16K 31/528* (2006.01)
*F04B 39/10* (2006.01)
*F04B 7/00* (2006.01)

(52) U.S. Cl.
CPC .......... *F16K 31/524* (2013.01); *F16K 31/528* (2013.01); *F16K 31/52458* (2013.01)

(58) Field of Classification Search
CPC ................ F04B 7/0069; F16K 31/524; F16K 31/52458; F16K 31/528; F01L 1/30
USPC ........................................................ 417/510
See application file for complete search history.

(56) References Cited

U.S. PATENT DOCUMENTS

| | | | |
|---|---|---|---|
| 6,305,336 | B1 | 10/2001 | Hara et al. |
| 6,443,717 | B1 | 9/2002 | Barber |
| 6,487,997 | B2 | 12/2002 | Palumbo |
| 7,343,888 | B1 | 3/2008 | VanValkenburgh |
| 2003/0019467 | A1 | 1/2003 | Mengoli |
| 2008/0053388 | A1* | 3/2008 | VanValkenburgh ...... F01L 1/30 123/90.24 |
| 2009/0013967 | A1 | 1/2009 | Louie |
| 2010/0086415 | A1 | 4/2010 | Spiegl et al. |
| 2012/0085305 | A1 | 4/2012 | Cleeves et al. |

FOREIGN PATENT DOCUMENTS

| | | |
|---|---|---|
| EP | 1319879 A1 | 6/2003 |
| FR | 2933761 | 1/2010 |
| GB | 544505 A | 4/1942 |
| GB | 628959 A | 9/1949 |
| JP | 62132081 A | 6/1987 |
| JP | 02221612 A | 9/1990 |
| JP | 0539780 A | 2/1993 |
| JP | 0682477 U | 11/1994 |
| JP | 2010285947 A | 12/2010 |
| WO | 2007117473 A2 | 10/2007 |
| WO | 2009153510 A1 | 12/2009 |

OTHER PUBLICATIONS

Unofficial English Translation of Japanese Office Action issued in connection with Corresponding JP Application No. 2015509426 dated Mar. 14, 2017.
Italian Search Report and Written Opinion dated Oct. 6, 2013 which was issued in connection with PCT Patent Application No. PCT/EP13/059059 which was filed on May 1, 2013.
Italian Search Report and Written Opinion dated Nov. 27, 2012 which was issued in connection with the Italian Patent Application No. CO2012A000021 which was filed on May 2, 2012.
Moreno et. al.: "Multibody Analysis of the Desmodromic Valve Train of the Ducati Motogp Engine", Proceedings of Eccomas, Multibody Dynamics 2007; Jun. 25-28, 2007 Milano, Italy.
Rivola et. al.: "A Camshaft Non-Linear Model for the Desmodromic Valve Train Simulation", Proceedings of ISMA 2004 International Conference on Noise & Vibration Engineering: Sep. 20-22, 2004, pp. 2051-2065 Location: Leuven, Belgium.
Unofficial English translation of Chinese Office Action issued in connection with corresponding CN Application No. 201380022918.X dated Dec. 2, 2015.

* cited by examiner

POSITIVE DRIVE ACTUATED VALVE FOR RECIPROCATING COMPRESSOR AND METHOD

BACKGROUND

Embodiments of the subject matter disclosed herein generally relate positive drive actuated valves used in reciprocating compressors for oil and gas industry, and related methods.

Figure 1A:
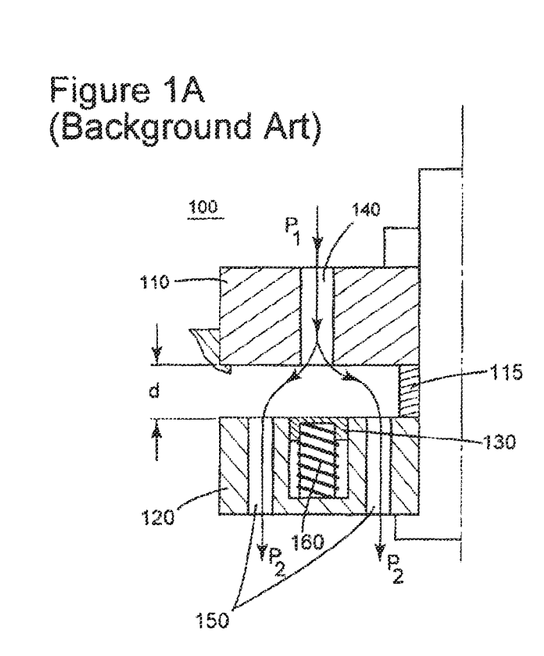
FIGS. 1A and 1B are schematic diagrams of a conventional automatic valve.
Figure 1B:
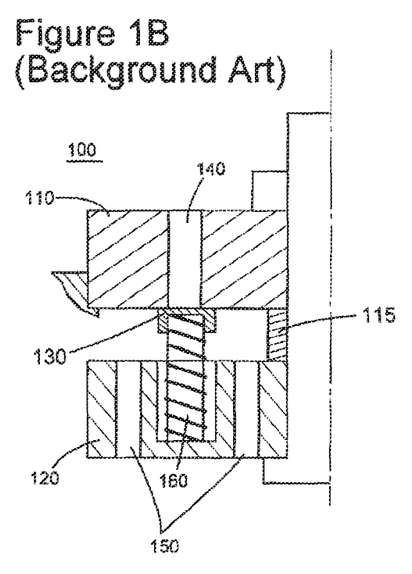

Conventionally, the valves used in a reciprocating compressor are automatic valves that are switched between a closed state and an open state due to a differential pressure across the valve. FIG. 1A illustrates a conventional automatic valve 100 in the open state, and FIG. 1B illustrates the valve 100 in the closed state. The automatic valve 100 has a seat 110 and a counter-seat 120. A distance d between the seat 110 and the counter-seat 120 is constant throughout the compression cycle (for example, a spacer 115 may be located there-between).

In the open state, a valve closing member 130 is positioned inside the counter-seat 120, allowing the fluid to flow through an inlet duct 140 and outlet ducts 150. The shape of the valve closing member 130 may be a disc, a poppet, multi-poppet or rings, which difference in shape gives the name of the valve: disc valve, poppet valve, multi-poppet valve or ring valve.

In the closed state, the valve closing member 130 prevents the fluid from flowing from the inlet duct 140 toward the outlet ducts 150. A spring 160 actively participates in the valve's operation, the elastic deformation force yielding a pressure along the flow path equal to the force divided by the area of the valve closing member 130. The valve 100 may be configured such that a force pushing the valve closing member 130 toward the counter-seat 120 has to be applied to the spring 160 in order to open the valve. Then, the first pressure $P_1$ from the source of the fluid has to be larger than the pressure $P_2$ at the destination of the fluid to open the valve 100. Since the spring 160 favors a faster closing of the valve 100, it is known as a "return" spring. However, the valve 100 may be configured such that a force has to be applied to push the valve closing member 130 toward the seat 110. Then, the first pressure $P_1$ from the source of the fluid has to be smaller than the pressure $P_2$ at the destination of the fluid to close the valve 100.

The spring 160 accelerates switching the valve 100 between the open state and the closed state, while the pressure difference across the valve ($P_1-P_2$) may change dynamically. The spring 160 is a part of valves that frequently fails, affecting reliability of the valve, and, thus, of the whole reciprocating compressor.

One disadvantage of the automatic valve is that the fluid in the volume in-between the seat 110 and the counter-seat 120 (which volume is in communication with the compression chamber) cannot be discharged, being therefore a source of inefficiency.

The automatic valve 100 is a linear valve since the valve closing member 130 executes a linear motion (i.e., translation). Instead of including a spring, linear valves may be actuated valves in which an actuating mechanism causes the linear (translation) motion of the valve closing member. Valve configurations and operating environment may concur to maintain the valve one state (i.e., closed or open), and to temporarily switch the valve into the other state upon receiving an actuating motion, but to return to the one state due to a built-in return mechanism.

Figure 2A:
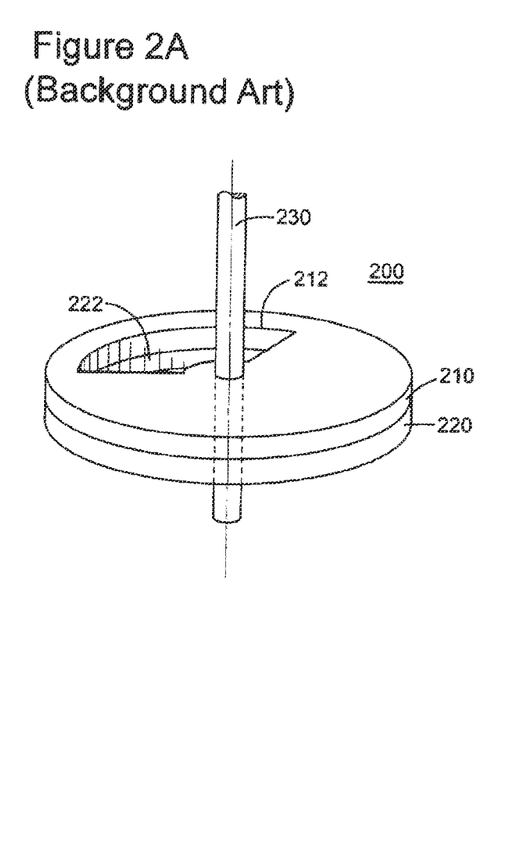
FIGS. 2A and 2B are schematic diagrams of a conventional rotary valve.
Figure 2B:
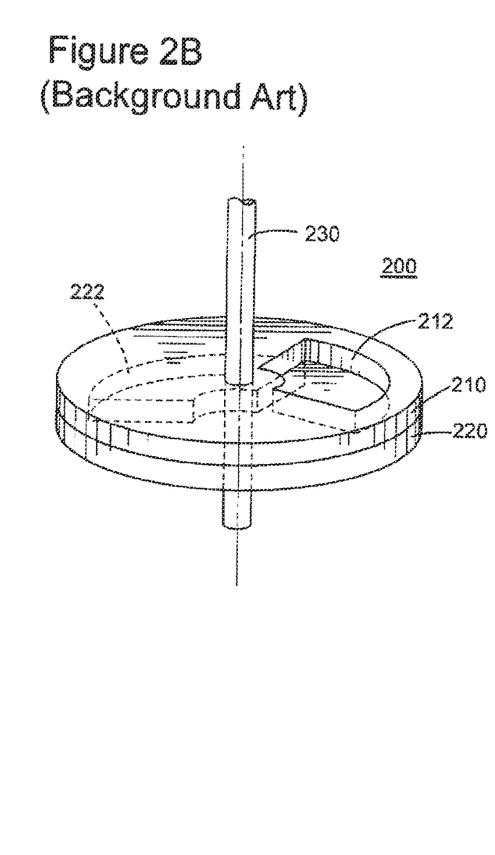

Rotary valves have been recently considered for reciprocating compressors in oil and gas industry. The rotary valves are actuated valves that provide a larger flow area than the linear valves, and are configured to alleviate the problem of inefficiency due to a valve-related volume from which the fluid cannot be discharged. FIGS. 2A and 2B are schematic representations of a rotary valve 200 in an open state and in a closed state, respectively. The rotary valve 200 has a mobile part (rotor) 210 and a fixed part (stator) 220 placed between a compression chamber of a reciprocating compressor and an inlet duct through which fluid enters or exits the compression chamber. The rotor 210 can rotate around the valve shaft 230 and has an opening 212. The stator 220 has an opening 222. When the valve 200 is in the open state (FIG. 2A), the rotor 210 is in a first position in which its opening 212 overlaps the opening 222 of the stator 220. When the valve 200 is in the closed state (FIG. 2B), the rotor 210 is in a second position in which its opening 212 does not overlap the opening 222 of the stator 220. The rotary valve 200 switches between the open state and the closed state when the rotor 210 rotates from the first position to the second position, and vice-versa.

The use of actuated valves (linear or rotary) in reciprocating compressors for the oil and gas industry requires relatively large forces, large displacements and short response times compared to respective ranges of these parameters characterizing currently available actuators. None of the currently available actuators can operate such as to meet these conditions simultaneously. Additionally, the use of electrical actuators (that are capable of operating in the required short response times) is further limited by the requirement to isolate the electrical actuators from the working fluids that are corrosive and/or inflammable.

In contrast to the equipment in oil and gas industry, actuating valves in automotive industry (most frequently done using electric actuators) may require a large force and a short response time, but not a large displacement. Additionally, in the automotive industry equipment, there is no concern about explosions—explosions being actually a sought-after phenomenon and the high pressure occurring due to explosions being easily dissipated in the ambient.

Further in contrast to the equipment in oil and gas industry, actuating valves in naval equipment (most frequently done with pneumatic or hydraulic actuators) requires large forces and may require large displacements, but the actuation time is not critical.

Accordingly, it would be desirable to provide valve assemblies and methods for efficiently actuating valves in reciprocating compressors used in oil and gas industry.

SUMMARY

Various embodiments of the current inventive concept set forth apparatuses and methods overcoming the technical challenges in actuating valves of reciprocating compressors used in oil and gas industry.

According to one exemplary embodiment, a positive drive valve actuating mechanism useable to operate a valve of a reciprocating compressor for oil and gas industry includes a driver configured to perform a rotating motion, and a follower connected to a mobile part of the valve and to the driver. The follower is configured to transform the rotating motion of the driver into a reciprocating motion to open the valve and to close the valve, respectively.

According to another exemplary embodiment, a reciprocating compressor has a compression chamber, a valve through which the fluid enters or is discharged from the compression chamber, and a positive drive valve actuating mechanism. The positive drive valve actuating mechanism includes a driver configured to perform a rotating motion, and a follower connected to a mobile part of the valve and to the driver. The follower is configured to transform the rotating motion of the driver into a reciprocating motion to open the valve and to close the valve, respectively.

According to another exemplary embodiment, a method for retrofitting a reciprocating compressor used in oil and gas industry is provided. The reciprocating compressor has a cylinder in which fluid is compressed; initially, the fluid is flowing to or from the cylinder via an automatic valve configured to switch between an open state and a closed state, depending on a differential pressure across the valve. The method includes providing a positive drive valve actuating mechanism including (A) a driver configured to perform a rotating motion and (B) a follower connected to a mobile part of the valve and to the driver, and configured to transform the rotating motion of the driver into a reciprocating motion to open the valve and to close the valve, respectively. The method further includes mounting the positive drive valve actuating mechanism so as to actuate to the mobile part of the valve.

BRIEF DESCRIPTION OF THE DRAWINGS

The accompanying drawings, which are incorporated herein and constitute a part of the specification, illustrate one or more embodiments and, together with the description, explain these embodiments. In the drawings.

DETAILED DESCRIPTION

The following description of the exemplary embodiments refers to the accompanying drawings. The same reference numbers in different drawings identify the same or similar elements. The following detailed description does not limit the invention. Instead, the scope of the invention is defined by the appended claims. The following embodiments are discussed, for simplicity, with regard to the terminology and structure of reciprocating compressors used in oil and gas industry. However, the valves to be discussed next may be applied to other equipment.

Reference throughout the specification to "one embodiment" or "an embodiment" means that a particular feature, structure or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

One objective of embodiments described hereinafter is to provide valve assemblies to actuate valves in reciprocating compressors for oil and gas industry, by generating displacements to open and to close the valves (i.e., positive drive mechanisms). The actuated valves may be linear (translating) valves or rotating valves. In contrast to an automatic valve, which is opened depending on a differential pressure on opposite sides of a valve closing member of the valve, an actuated valve opens and/or closes upon receiving respective displacements from an actuator. Actuated valves are more reliable than automatic valves and provide advantages for increasing the efficiency and reducing the clearance volume for the reciprocating compressors used in oil and gas industry.

FIGS. 3A, 3B, 4 and 5 illustrate positive drive valve actuating mechanisms for linear (translating) valves. FIGS. 6A, 6B, 7A and 7B illustrate positive drive valve actuating mechanisms for rotary valves. The term positive drive is used relative to actuating mechanisms including irregularly shaped parts executing rotating motions to actuate valve mobile parts, thereby switching the valves between open and closed states.

Figure 3A:
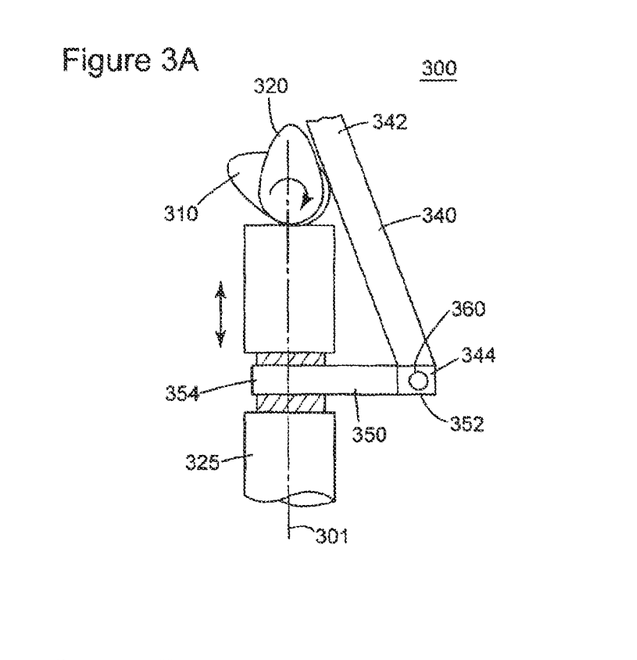
FIGS. 3A and 3B are views of a positive drive valve assembly for actuating a linear valve, according to an exemplary embodiment.
Figure 3B:
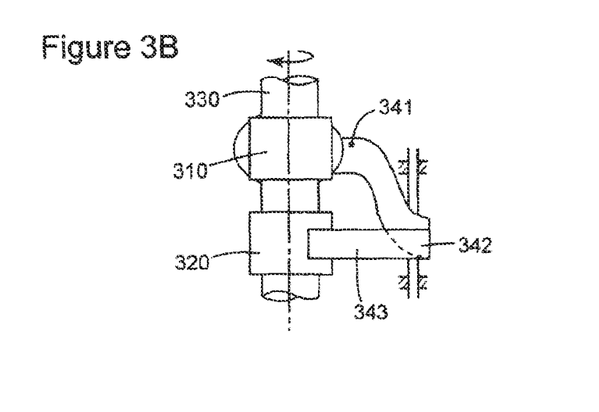

FIGS. 3A and 3B are perpendicular views of a positive drive valve assembly 300 for actuating a linear valve, according to an exemplary embodiment. The valve assembly 300 includes a first cam 310, a second cam 320 and a cam shaft 330 configured to transmit a continuous rotation motion to the first cam 310 and to the second cam 320. A first arm 340 of the valve actuating mechanism is configured to have a cam-contact end 342 in contact with the closing cam 310 and/or the opening cam 320, and a joint end 344 opposite the cam-contact end 342. As illustrated in FIG. 3B the cam-contact end 342 bifurcates into a first portion 341 and a second portion 343 to be in direct contact with the closing cam 310 or to the opening cam 320, respectively.

A second arm 350 of the valve actuating mechanism has a joint end 352 rigidly connected via a joint 360 to the joint end 344 of the first arm 340, and a shaft end 354 opposite the joint end 352 of the second arm 350. The shaft end 354 is actually a fork that engages the valve shaft 325 in a groove that has a smaller diameter around a location where the shaft end 354 of the second arm 350 engages the valve shaft 325.

The first cam 310 pushes down the shaft 325 due to its elongated portion. The second cam 320 then pushes the first arm 340 to rotate clockwise, due to its asymmetrically elongated profile, which makes the second arm 350 similarly rotate clockwise, thereby pushing the valve shaft 325 up. When the first cam 310 then pushes again down the shaft 325, the second arm 350 is also pushed down, causing it to rotate counter-clockwise. The counter-clockwise rotation of the second arm 350 makes the first arm 340 also rotate, returning to a position from which it may then be pushed again by the second cam 320.

Figure 4:
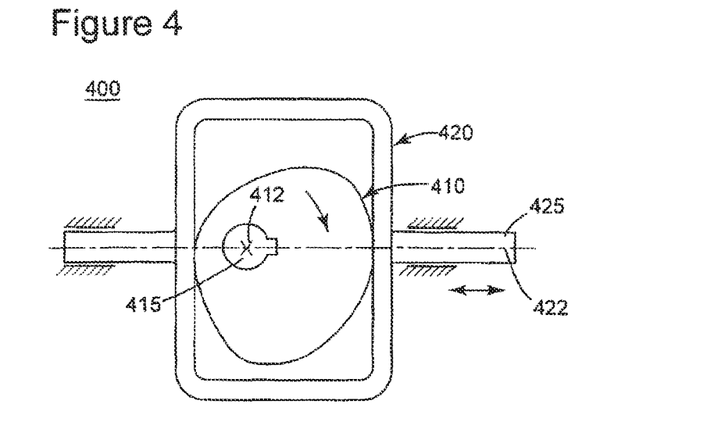
FIG. 4 is a schematic diagram of a positive drive valve actuating mechanism for actuating a linear valve, according to another embodiment.

FIG. 4 illustrates a positive drive valve actuating mechanism 400 for actuating a linear valve, according to another embodiment. The positive drive valve actuating mechanism 400 includes a cam 410 rotating around an axis 412 due to a rotating shaft 415. The cam 410 is placed inside a follower 420 that is pushed toward right or toward left, depending on the distance from the circumference of the cam 410 to the inner sides of the follower 420. The follower 420 is attached to the valve closing member of the linear valve (not shown) via the shaft 425. Thus, the valve actuating mechanism 400 is configured to transform a continuous rotation of the cam 410 into an alternating translation along the axis 422.

Figure 5:
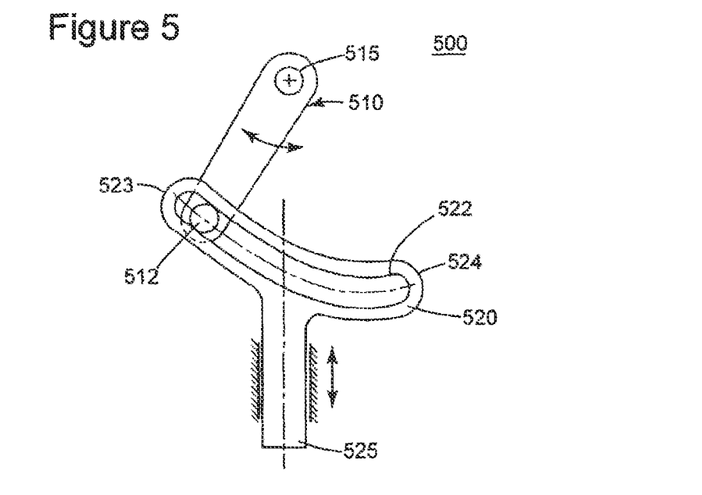
FIG. 5 is a schematic diagram of a positive drive valve actuating mechanism for actuating a linear valve, according to another embodiment.

FIG. 5 illustrates a positive drive valve actuating mechanism 500 for actuating a linear valve, according to another embodiment. The positive drive valve actuating mechanism 500 includes a driver 510 configured to perform an alternating angular displacement around the axis 515 located at a first end of the driver 510. The positive drive valve actuating mechanism 500 further includes a follower 720 connected to a shaft 525 and having a closed profile 522 with one end 523 closer to the axis 515 than another end 524. The driver 510 has a notch 512 at a second end opposite to the first end thereof where the axis 515 is located. The notch 512 is placed and configured to slide inside the profile 522. As the notch 512 slides from end 523 of the profile 522 toward the other end 524 when the driver 510 rotates counter-clockwise, the follower 520 is pushed away from the axis 515 (down in FIG. 5). As the notch 512 slides from the end 524 of the profile 522 toward the other end 523 when the driver 510 rotates clockwise, the follower 520 is pulled toward the axis 515 (up in FIG. 5). Thus, the positive drive valve actuating mechanism 500 is configured to transform an alternating angular displacement (rotation) of the driver 510 into an alternating translation of the shaft 525 which is connected to the valve closing member of a linear valve (not shown).

Figure 6A:
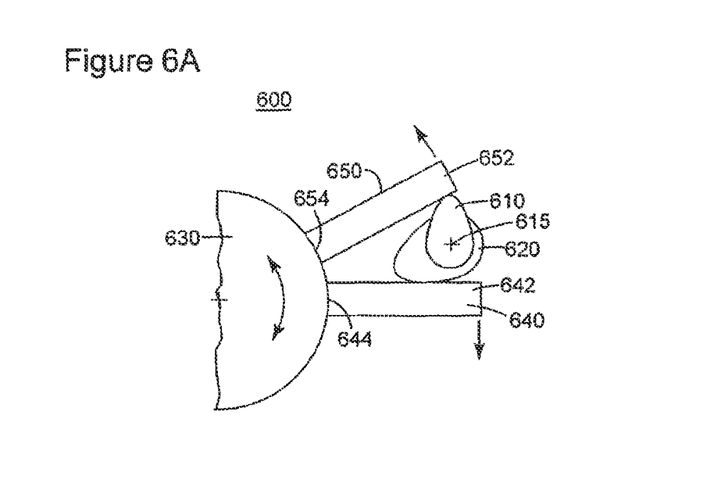
FIGS. 6A and 6B are views of a positive drive valve actuating mechanism for actuating a rotary valve, according to an exemplary embodiment.
Figure 6B:
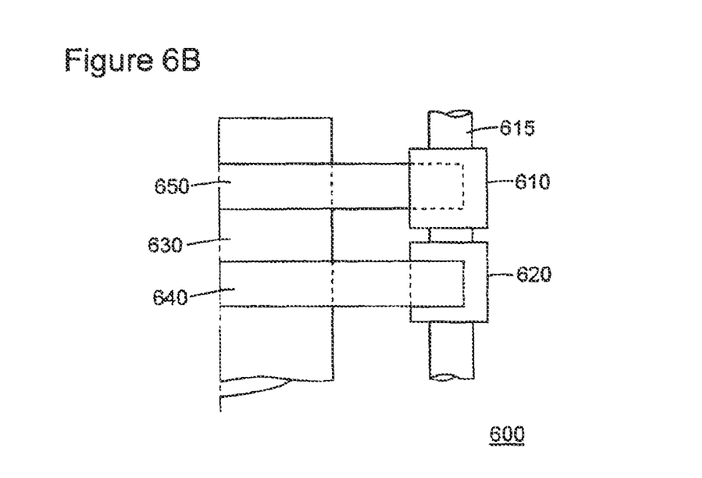

FIGS. 6A and 6B are different views (perpendicular to one another) of a valve actuating mechanism 600 for actuating a rotary valve according to another exemplary embodiment. The valve actuating mechanism 600 includes an opening cam 610 and a closing cam 620. The opening cam 610 and the closing cam 620 are rotated by a cam shaft 615.

The valve actuating mechanism 600 includes an opening arm 650 that has (1) a cam end 652 that is, temporarily during a full rotation of the cam shaft 615, in contact with the elongated portion of the opening cam 610, and (2) a valve shaft end 654 fixedly attached to the valve shaft 630 at a first angular position. The valve actuating mechanism 600 further includes a closing arm 640 that has (1) a cam end 642 that is, temporarily during a full rotation of the cam shaft 615, in contact with the elongated portion of the closing cam 620, and (2) a valve shaft end 644 fixedly attached to the valve shaft 630 at a second angular position different from the first angular position. Between a first connecting zone of the opening arm 650 to the valve shaft 630 and a second connecting zone of the closing arm 640 to the valve shaft 630 may be a spacer.

The valve shaft 630 and the cam shaft 615 are substantially parallel. As the cam shaft 615 rotates together with cams 610 and 620, the elongated portion of the opening cam 610 pushes the opening arm 650 and the valve shaft 630 counter-clockwise, causing an angular displacement of a rotor of a rotary valve (not shown). Then, the elongated portion of the closing cam 620 pushes the closing arm 640 and the valve shaft 630 clockwise, causing an opposite angular displacement of the rotor of the rotary valve. Thus, the valve actuating mechanism 600 is configured to transform a continuous rotation of the cams 610 and 620 into an alternating rotation of the valve shaft 630 which is connected to the rotor of the rotary valve.

Figure 7A:
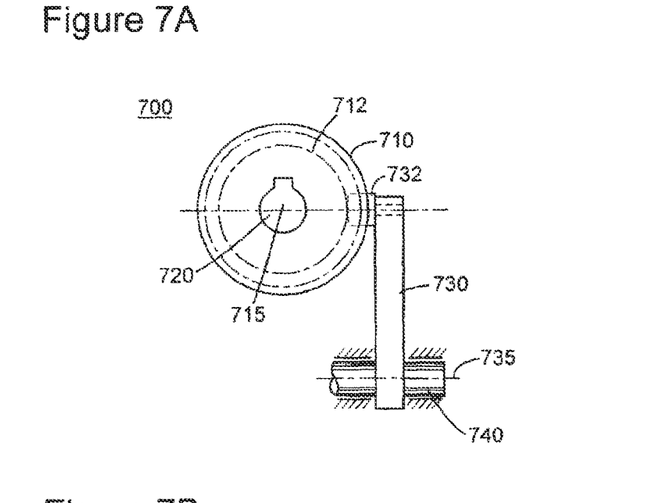
FIGS. 7A and 7B are views of a positive drive valve actuating mechanism for actuating a rotary valve, according to another embodiment.
Figure 7B:
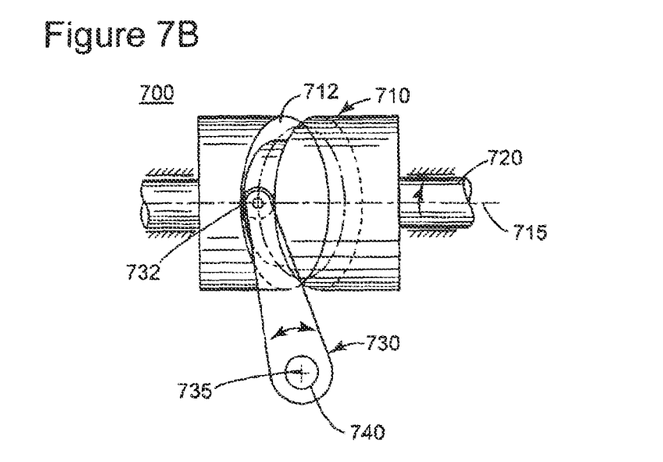

FIGS. 7A and 7B are different views (perpendicular to one another) of a positive drive valve actuating mechanism 700 for a rotary valve, according to another embodiment. The positive drive valve actuating mechanism 700 includes a grooved cylinder 710 attached to a shaft 720. The grooved cylinder 710 rotates around axis 715, and has a groove 712 forming a closed loop on its outer surface. The position of the groove 712 varies around the surface along the axis 715.

The positive drive valve actuating mechanism 700 further includes an oscillating follower 730. The oscillating follower 730 has a notch 732 at one end. The notch 732 slides on the groove 712 when the grooved cylinder 710 rotates. The oscillating follower 730 is configured to rotate around an axis 735 as the notch 732 sliding on the groove 712 moves toward left or toward right in FIG. 7B, due to the variation of the position along the axis 715 of the groove 712. The oscillating follower 730 is attached to a shaft 740 positioned along the axis 735 and attached to a rotor of a rotary valve (not shown). Thus, the positive drive valve actuating mechanism 700 is configured to transform a continuous rotation of the grooved cylinder 710 into an alternating angular displacement around the axis 735.

Figure 8:
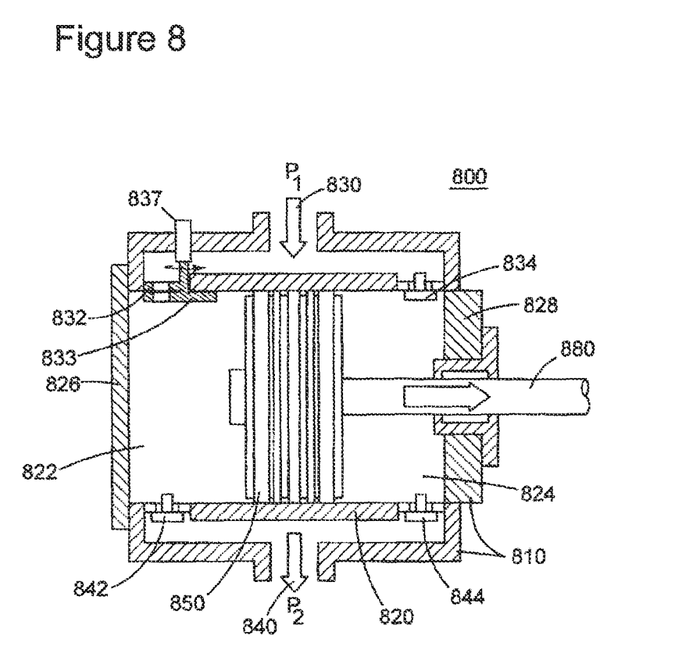
FIG. 8 is a schematic diagram of a reciprocating compressor, according to an exemplary embodiment.

Any of the positive drive valve actuating mechanisms may be used in a reciprocating compressor 800 that is schematically illustrated in FIG. 8. The compressor 800 is a dual chamber reciprocating compressor. However, valve assemblies according to embodiments similar to the ones illustrated in FIGS. 3-7 may be used also in single chamber reciprocating compressors. The compression occurs in chambers 822 and 824 of a cylinder 820. A fluid to be compressed (e.g., natural gas) is input into the cylinder 820 via an inlet 830, and, after the compression, is output via an outlet 840. The volumes of the chamber 822 and 824 are modified due to the movement of the piston 850 along the longitudinal axis of the cylinder 820, alternating between moving toward a head end 826 and toward a crank end 828. The piston 850 divides the cylinder 820 in two chambers 822 and 824 operating in different phases of the cyclic process, the volume of chamber 822 being at its lowest value when the volume of chamber 824 is at its highest value and vice-versa.

Suction valves 832 and 834 open to allow the fluid that is going to be compressed (i.e., having a first pressure $P_1$) from the inlet 830 into the chambers 822 and 824, respectively. Discharge valves 842 and 844 open to allow the fluid that has been compressed (i.e., having a second pressure $P_2$) to be output from the chambers 822 and 824, respectively, via the outlet 840. The piston 850 moves due to energy received, for example, from a crankshaft (not shown) via a crosshead (not shown) and a piston rod 880. In FIG. 8, the valves 832, 834, 842, and 844 are illustrated as being located on a lateral wall of the cylinder 820. However, the valves 832 and 842, 834 and 844, may be located on the head end 826 and/or the crank end 828 of the cylinder 820, respectively.

In contrast to an automatic valve, which opens and closes depending on a differential pressure across the valve, the actuated valve 832 opens and closes due to angular displacements received from a valve assembly 837. One or more valves of the reciprocating compressor 800 may be actuated valves. A combination of actuated valves and automatic valves may also occur in some embodiments; for example, the suction valves may be actuated while the discharge valves may be automatic valves.

Some of the embodiments have one or more of the following advantages: better control of the timing of opening and closing the valve and enhanced stability. Additionally, the efficiency of the compressor may be enhanced by decreasing the volume associated with the valve from which the fluid cannot be discharged.

Figure 9:
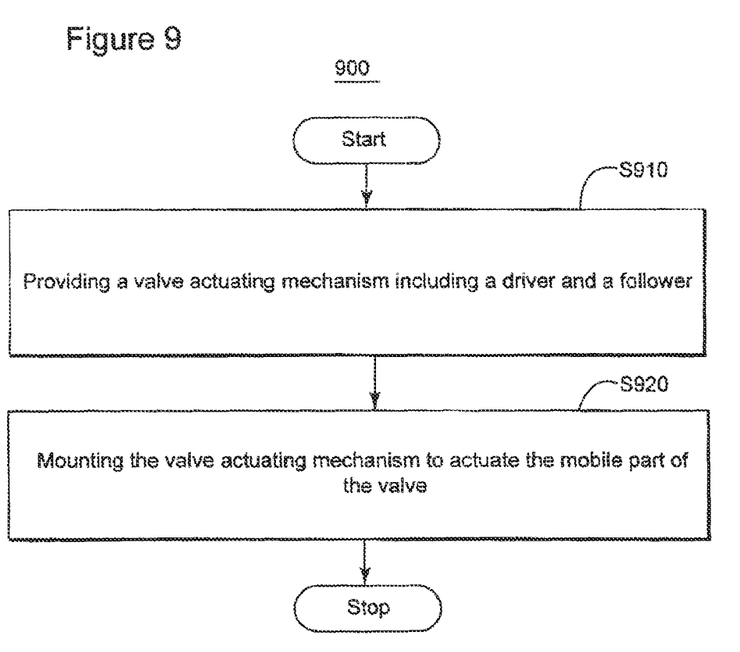
FIG. 9 is a flowchart illustrating a method for retrofitting a reciprocating compressor used in oil and gas industry, according to an exemplary embodiment.

Existing reciprocating compressors having a cylinder in which fluid is compressed, the fluid flowing to or from the cylinder via an automatic valve configured to switch between an open state and a closed state depending on a differential pressure across the valve, may be retrofitted to have the valve actuated using one of the above-described positive drive valve actuating mechanisms. FIG. 9 is a flowchart illustrating a method 900 for retrofitting a reciprocating compressor used in oil and gas industry according to an exemplary embodiment. The method 900 includes providing a positive drive valve actuating mechanism including (A) a driver configured to perform a rotating motion and (B) a follower connected to a mobile part of the valve and to the driver, and configured to transform the rotating motion of the driver into a reciprocating motion to open the valve and to close the valve, respectively, at 5910. The method 900 further includes mounting a positive drive valve actuating mechanism so as to actuate the mobile part of the valve, at 5920. The method 900 may also include connecting the driver to a shaft that provides the rotating motion.

The disclosed exemplary embodiments provide positive drive valve actuating mechanisms for valves of reciprocating compressors used in oil and gas industry. It should be understood that this description is not intended to limit the invention. On the contrary, the exemplary embodiments are intended to cover alternatives, modifications and equivalents, which are included in the spirit and scope of the invention as defined by the appended claims. Further, in the detailed description of the exemplary embodiments, numerous specific details are set forth in order to provide a comprehensive understanding of the claimed invention. However, one skilled in the art would understand that various embodiments may be practiced without such specific details.

Although the features and elements of the present exemplary embodiments are described in the embodiments in particular combinations, each feature or element can be used alone without the other features and elements of the embodiments or in various combinations with or without other features and elements disclosed herein.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

What is claimed is:

1. A positive drive valve actuating mechanism for operating a linear valve of a reciprocating compressor for use in the oil and gas industry, the valve actuating mechanism comprising:
   a rotatable driving mechanism comprising a first cam and a second cam configured to rotate around an axis, wherein elongated parts of the first cam and the second cam, respectively, are located at different angular positions; and
   a follower connected to a valve shaft of the linear valve and to the rotatable driving mechanism, and configured to transform a rotating motion of the rotatable driving mechanism into a reciprocating motion of the valve shaft to open and close the linear valve, the follower comprising a first arm having a cam-contact end in contact with profiles of the first cam and the second cam, a second arm having a shaft-contact end attached to the valve shaft, and a rigid joint connecting an end of the first arm opposite the cam-contact end to an end of the second arm opposite the shaft-contact end,
   wherein the shaft-contact end of the second arm is a fork that engages the valve shaft in a groove.

2. The positive drive valve actuating mechanism of claim 1, wherein the cam-contact end of the first arm is bifurcated into a first portion and a second portion.

3. The positive drive valve actuating mechanism of claim 2, wherein the first portion of the cam contact end of the first arm is in direct contact with the first cam and the second portion of the cam-contact end of the first arm is in direct contact with the second cam.

4. The positive drive valve actuating mechanism of claim 1, wherein the groove has a smaller diameter around a location where the shaft-contact end of the second arm engages the valve shaft.

\* \* \* \* \*